United States Patent Office 3,052,340
Patented Sept. 4, 1962

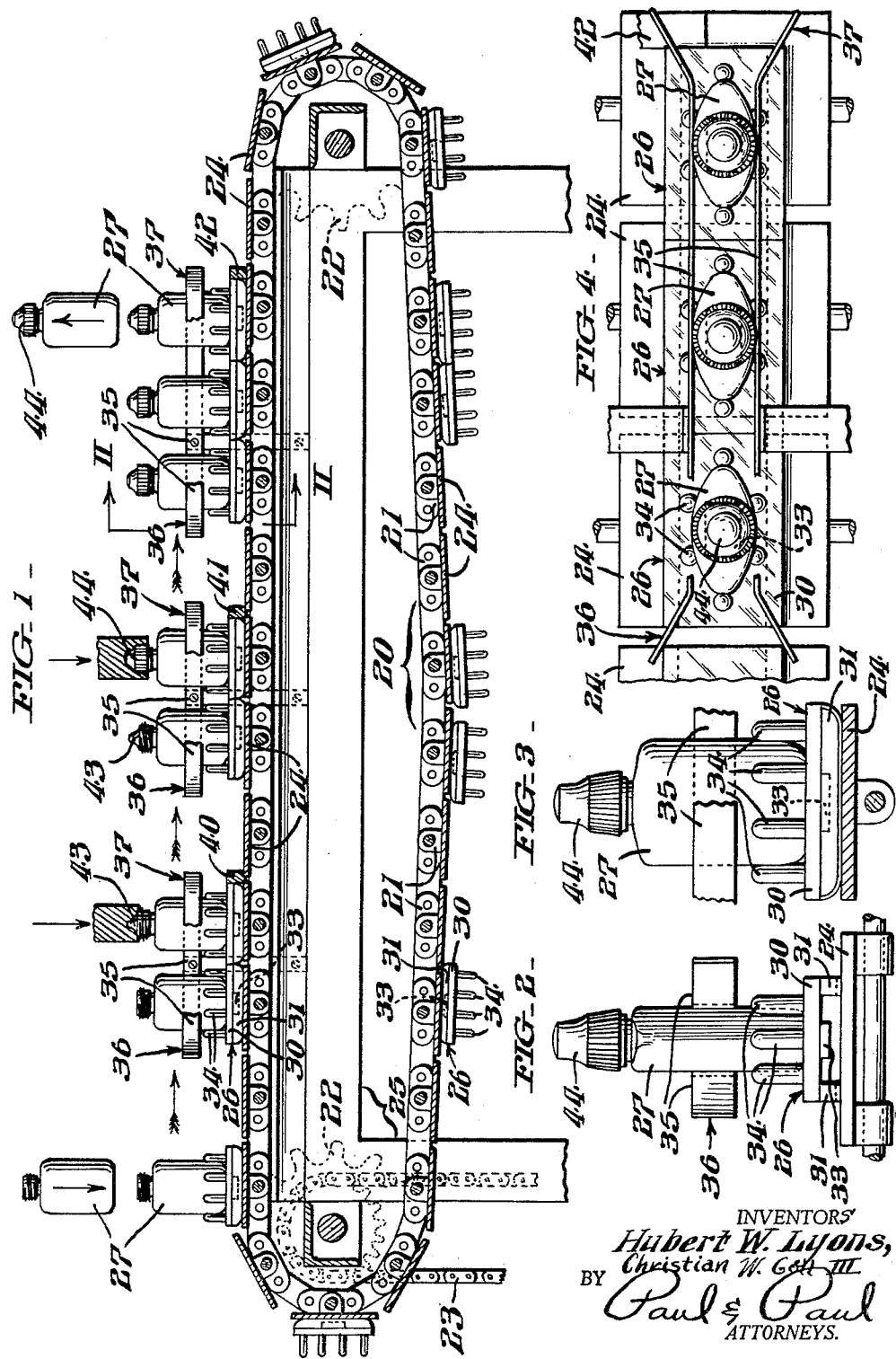

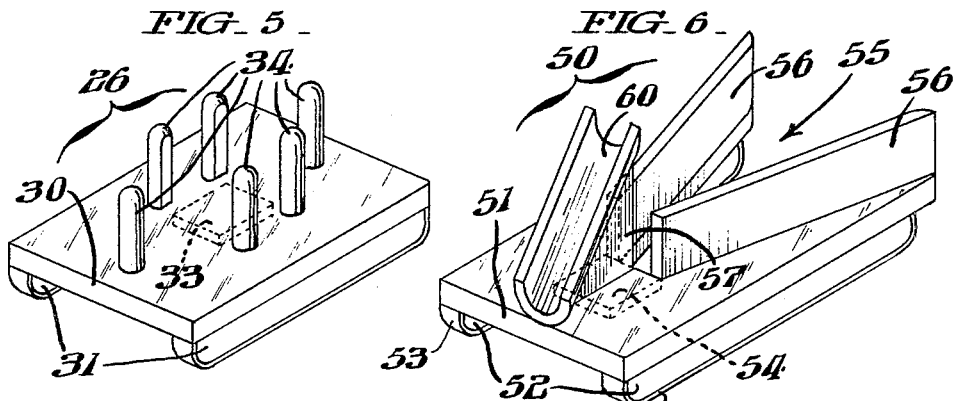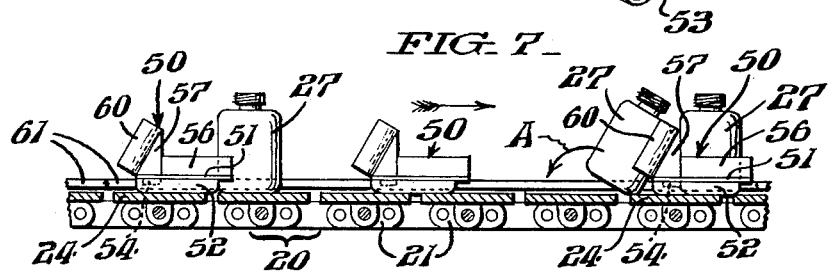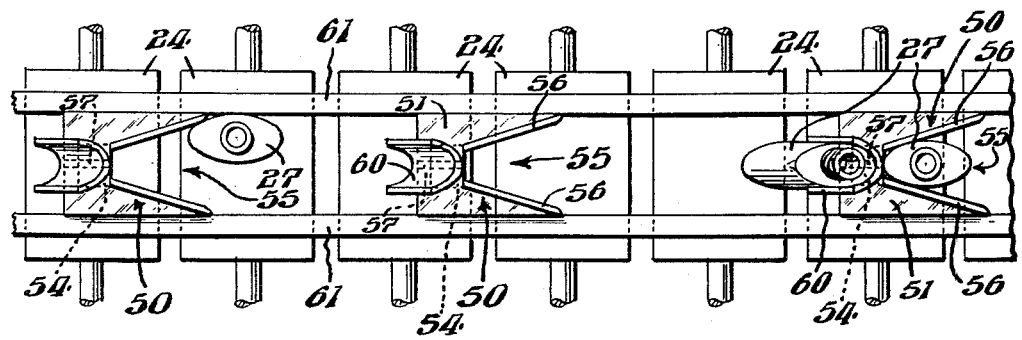

3,052,340
ARTICLE HANDLING AND CONVEYOR
APPARATUS
Hubert W. Lyons and Christian W. Goll III, Philadelphia, Pa., assignors to Merck & Co., Inc., Rahway, N.J., a corporation of New Jersey
Filed Aug. 26, 1959, Ser. No. 836,185
8 Claims. (Cl. 198—41)

This invention relates to an article handling apparatus, and more particularly relates to a conveyor apparatus for conveying continuously a plurality of individual objects from one place to another. More specifically, this invention has application to the article handling field, wherein large numbers of articles all of which are of the same size and shape are processed on a continuous conveyor belt.

In many industries, particularly the packaging industry, it is desirable to move a plurality of containers along on top of a continuously running conveyor, and to fill, cap and otherwise handle the containers while they are on the conveyor. Various structures have been provided which enable the operators of the apparatus to stop individual containers at selected places along the conveyor line where various processing operations such as filling, capping, loading and unloading can be performed. This has usually necessitated the provision of relatively complicated and expensive equipment, and has sometimes required the starting and stopping of the conveyor at a multiplicity of different times and places.

It is an object of this invention to provide a simple and accurate means for handling articles such as containers and the like on a continuously running conveyor, wherein the articles can be stopped without stopping the conveyor.

Still another object of this invention is to provide a novel and simple means for causing a plurality of articles to travel with the movement of the conveyor, but allowing the operator to stop the articles individually at any selected place or time without interfering with the operation of the conveyor or of the continued movement of other articles thereon.

Still another object is to provide an apparatus of the type referred to above, wherein various different operations may be carried out, including operations involving a twisting or pressing action on the container itself.

Still another object of this invention is to provide an article carrier which is adapted to be used in conjunction with a continuously moving conveyor belt, which article carrier is readily and indiviudually movable from one point to another without interfering with the operation of the conveyor.

Still another object of this invention is to provide a carrier of the type specified above, which also includes a novel and convenient loading means for loading articles upon the conveyor.

Other objects and advantages of this invention, including the simplicity and economy of the same and the ease with which it may be applied to existing equipment, will further become apparent hereinafter and in the drawings whereof:

FIG. 1 represents a view in side elevation showing an apparatus which embodies features of this invention.

FIG. 2 is a view taken as indicated by the lines and arrows II—II which appear in FIG. 1.

FIG. 3 is a view in side elevation, with a portion of the conveyor shown in section, showing the apparatus which appears in FIG. 2.

FIG. 4 is a partial plan view of the apparatus which appears in FIG. 1.

FIG. 5 is a perspective view of an article carrier which appears in the preceding figures.

FIG. 6 is a perspective view of a modified form of an article carrier in accordance with this invention.

FIG. 7 is a schematic view in side elevation illustrating the plurality of the carriers of FIG. 6, mounted upon the upper flight of the conveyor, and FIG. 8 is a plan view, somewhat enlarged, of the apparatus which appears in FIG. 7.

It will be appreciated that, in describing the specific forms of the invention selected for illustration in the drawings, specific terms will be used for the sake of clarity. It will further be appreciated that the use of these specific terms in the specification is not intended to limit the scope of the invention which is defined in the claims.

Referring now to the form of the invention selected for illustration in FIGS. 1–4 of the drawings, the number 20 designates a conveyor of the endless type, having a plurality of links 21 all of which are pivoted to one another. The conveyor, at each end, passes around a sprocket 22, one of which is used as a drive means operated from a sprocket chain 23. The conveyor includes a plurality of plates 24 which closely abut one another. Each plate is fixed to the outer portion of the corresponding link 21, and is constructed of a material which is subject to magnetic attraction. A ferrous metal such as iron or steel is customarily used, for example.

Preferably, the lines of force should be directed in such a way that the greatest attraction is obtained between the magnet and the conveyor.

The magnet can be held on by cement, soft iron inserts drilled and tapped, or a small strap of non-ferrous material, or by any other means that appears to be desirable.

It is to be appreciated that the entire conveyor structure may be mounted on a supporting device such as the support 25.

A plurality of carriers 26 are provided, each being readily separable from the conveyor and each being constructed to hold an article such, for example, as a container 27.

Each carrier 26 has a base 30, a pair of parallel spaced apart runners 31 depending from the base, each runner on its bottom preferably being coated with a slippery material such as polytetrafluoroethylene, for example.

Firmly secured to the bottom of the base 30 on each carrier 26 is a permanent magnet 33 which is spaced slightly above the level of the bottoms of the runners 31. Thus, each magnet 33 is spaced slightly above the conveyor plate 24 when the carrier 26 is supported upon the conveyor. However, it is important that each magnet 33 be sufficiently close to the surface of the plate 24 that a magnetic attraction exists between the two.

Upstanding from the base 30 on each carrier 26 is a containing structure which, as shown in FIGS. 1–5, is represented by a plurality of spaced upstanding posts 34 which are spaced in such positions that they form an inner line which conforms to the shape of the outer surface of the container 27. Thus, each container 27 can readily be placed into the space defined by the posts 34 by a vertically downward movement, and can be removed by a reverse, upward movement.

The apparatus also includes, when desired, guide rails 35 which are mounted in a stationary position and preferably supported upon the support 25. The guide rails 35 are spaced apart from one another in accordnace with the widths of the articles being handled, as appears clearly in FIG. 4. These guide rails 35 have a converging portion 36 and a diverging portion 37 for controlling the movement of the article carriers 26 along the upper flight of the conveyor 20.

Stop means are provided at spaced locations along the upper flight of the conveyor 20, to control the movement of the carriers independently of the movement of the conveyor. Such stop means bear the number 40, 41, 42.

In the operation of the apparatus shown in FIGS. 1–5 of the drawings, it will be appreciated that the operator may place at random any desired number of carriers 26, either by placing them on top of the upper run of the conveyor or even by placing them on the bottom of the lower run of the conveyor 20. The individual carriers, because of the magnetic attraction between the magnet 33 and the plates 24 which are subject to magnetic attraction, move linearly with the movement of the conveyor unless, of course, an interrupting influence is exerted upon the carriers. Each carrier, if placed underneath the lower return run of the conveyor 20, adheres to the corresponding plate and moves upwardly around the left hand sprocket shown in FIG. 1, until it reaches a position at the entrance of the upper flight of the conveyor 20. At this position it is possible for the operator, for example, to load a container 27 into the carrier 26. At a location spaced from the loading station, the stop 40 may be utilized, for example to stop the plurality of carriers at a plugging station where a plug 43 is inserted into the neck of the container 27.

At another location spaced forwardly of the plugging location, another stop 41 may be utilized to stop a group of carriers 26 in order to apply the caps 44. At this location, the guide rails 35 hold the container 27 in a fixed position so that the twisting movement of the capping machine is resisted.

At still another location spaced forwardly along the upper run of the conveyor 20, another stop 42 may be utilized to provide a collection of plugged and capped containers 27, so that they may be removed by the operator. Guides may be added if desired, to prevent the carrier from being lifted along with the container.

Referring now to the specific form of the invention shown in FIGS. 6–8 of the drawings, the carrier 50 has a base 51 and spaced runners 52 which are preferably coated with a slippery material 53. A magnet 54 is provided on the base 51.

At its forward end, a diverging gap 55 is provided in the base 51, and upwardly extending guides 56 are provided at the sides of the gap 55. At the rear extremity of the gap 55, a support plate 57 extends upwardly from the base 51. The rear surface of the support plate 57 is inclined at an angle to the vertical, and a curved guiding and supporting member 60, also inclined, is secured to the support plate 57.

FIG. 7 shows the carrier 50 mounted in working position on a conveyor which is constructed in the same manner as heretofore discussed in connection with FIGS. 1–5.

In operation, containers 27 may be placed at random either within the gap 55 or on any of the conveyor plates 24. Whenever a stop member such as the stops 40, 41, 42 stops the movement of a container 27, the guide members 56 cause the carrier 50 to embrace the container 27. When the container 27 is contacted by the base at the rear extremity of the gap 55, the container 27 is then caused to move forwardly with the carrier 50, whenever the obstruction or stopping means is removed.

It will be observed that the curved inclined supporting and loading structure 60 is useful for introducing container 27 to the conveyor 20. The operator may simply place the container 27 in the curved portion of the supporting and loading member 60, as illustrated at the right hand portion of FIG. 7, whereupon the container 27 tilts rearwardly as indicated by the arrow A in FIG. 7.

As appears in FIGS. 7 and 8, guides 61 may be provided for maintaining the carriers 50 in properly aligned positions on the conveyor 20.

Accordingly, it will be appreciated that means have been provided for holding articles which are difficult to maintain in an upright position during movement along a conveyor for purposes of assembly, disassembly, filling, stamping, labeling, stoppering, capping or the like. The carrier may be composed of any ferrous or non-ferrous material such as wood, aluminum or plastic, and may be shaped in any desired manner in order to receive the article to be moved along the conveyor.

Although holders have been disclosed which have magnets spaced from the conveyor, the magnets may be so positioned that they actually contact the conveyor. The position of the magnet is subject to considerable variation, so long as the sliding movement between the holder and the conveyor is not interfered with and further providing that the magnetic attraction causes the holder to be moved linearly with the conveyor when no obstruction prevents such movement. It is important that the holder may be kept in a single position while the conveyor belt continues to move, sliding underneath but in contact with the holder. When the holder is released, magnetic attraction again causes the holder to move with the conveyor. When the article is removed from the holder, the magnetic attraction between the conveyor and the holder cause the holder to be held to the conveyor belt as the belt returns in the opposite direction and underneath the original line of travel.

It will be appreciated further that it may be unnecessary in some cases for the operator to remove the containers from the holder. In view of the strong magnetic attraction between the holder and the belt, the holder and container may simply be permitted to travel around an end of the belt, permitting the containers to fall out of the holders by gravity.

This invention can, if desired, be used on conveyors or the like which do not require any stopping or holding means for the containers, and in any such case the invention renders the conveyors useful for a wide variety of purposes.

Various modifications may be made without departing from the spirit or scope of this invention. For example, although it is desirable to include a coating of polytetrafluoroethylene or the like on the runners 31, 52, these may be dispensed with in some cases where the material of the runner itself has sufficient ability to slide with respect to the surface of the conveyor. Similarly, conveyors of various types may be used, including woven conveyors which are composed of a metal which is subject to magnetic attraction. Other changes may be made, including the substitution of equivalents for those specifically shown, the use of certain features independently of other feautres, and reversal of parts, all without departing from the spirit or scope of this invention as defined in the appended claims.

Having thus described our invention, we claim:

1. In an article handling apparatus, the combination which comprises an endless conveyor having an upwardly facing delivery run and a downwardly facing return run, said conveyor including a material which is subject to magnetic attraction, an article transporting member adapted to be advanced on the conveyor, said member having a base provided with runner means arranged to bear on the material of the conveyor, and a magnet affixed to said base in a position to cause the member to cling to the conveyor in an upright position while on the delivery run of said conveyor and in an inverted position on said return run, and a stop means located in a position along the line of conveyor travel and movable into the path of the carrier to arrest it notwithstanding continued movement of the conveyor.

2. The apparatus according to claim 1, further including guide means for controlling the transporting member to keep said runner arranged in the direction of conveyor travel.

3. The apparatus according to claim 1, wherein the transporting member is provided with a plurality of spaced upstanding projections for reception between them of an article to be carried, and further including laterally-spaced stationary longitudinally extending guide strips adapted to be engaged by opposite sides of the article to control the transporting member so that its runner is maintained substantially parallel to the direction of conveyor travel.

4. The apparatus according to claim 3, in which the projections on the transporting member are in the form of short upstanding studs; and wherein the guide strips are disposed at an elevation to clear the projections on the transporting member.

5. The apparatus according to claim 4, in which the guide strips have outwardly bent portions at one end to facilitate entry of the article on the transporting member.

6. The apparatus according to claim 1, wherein a pair of parallel runners is provided, wherein each runner has a slippery base for capacity to slide readily relative to the material of the conveyor, and wherein a wedge-shaped opening means is provided at the front end of the base forming a restraining means for the article.

7. The apparatus according to claim 1, wherein said runner has a slippery base for capacity to slide readily relative to the plate of the conveyor, wherein a wedge-shaped opening means is provided at the front end of the base forming a restraining means for the article, and a pair of angle walls extend upward from said wedge-shaped opening.

8. The apparatus according to claim 1, wherein said runner has a slippery base for capacity to slide readily relative to the plate of the conveyor, wherein a wedge-shaped opening means is provided at the front end of the base forming a restraining means for the article, wherein means are provided forming a retaining means for the article transported by said member, and wherein an upstanding wall is provided on top of the base having a rearwardly downwardly inclined surface thereon and a rearwardly inclined trough in the top of said wall.

References Cited in the file of this patent

UNITED STATES PATENTS

| | | |
|---|---|---|
| 672,663 | Baxter | Apr. 23, 1901 |
| 1,452,836 | Hoyt | Apr. 24, 1923 |
| 1,724,908 | Comstock | Aug. 20, 1929 |
| 2,609,915 | Burgh | Sept. 9, 1952 |
| 2,740,515 | Wilson | Apr. 3, 1956 |